(12) United States Patent
Zodnik

(10) Patent No.: US 6,868,265 B2
(45) Date of Patent: Mar. 15, 2005

(54) LOCATOR FOR PHYSICALLY LOCATING AN ELECTRONIC DEVICE IN A COMMUNICATION NETWORK

(75) Inventor: Richard Zodnik, San Juan Capistrano, CA (US)

(73) Assignee: Accelerated Performance, Inc., San Juan Capistrano, CA (US)

( * ) Notice: Subject to any disclaimer, the term of this patent is extended or adjusted under 35 U.S.C. 154(b) by 55 days.

(21) Appl. No.: 10/122,274

(22) Filed: Apr. 11, 2002

(65) Prior Publication Data

US 2002/0169873 A1 Nov. 14, 2002

Related U.S. Application Data

(63) Continuation-in-part of application No. 09/772,344, filed on Jan. 29, 2001.

(51) Int. Cl.[7] .................................................. H04Q 7/38
(52) U.S. Cl. ...................................................... 455/404.1
(58) Field of Search ................................ 709/220, 223; 455/404.1, 404, 404.2

(56) References Cited

U.S. PATENT DOCUMENTS

| | | |
|---|---|---|
| 4,562,482 A | 12/1985 | Brown |
| 4,603,925 A | 8/1986 | Cuevas-Cumming |
| 5,002,184 A | 3/1991 | Lloyd |
| 5,108,063 A | 4/1992 | Koerber, Sr. et al. |
| 5,174,223 A | 12/1992 | Nagy et al. |
| 5,348,324 A | 9/1994 | Trotta |
| 5,483,467 A | 1/1996 | Krupka et al. |
| 5,530,842 A | 6/1996 | Abraham et al. |
| 5,548,729 A * | 8/1996 | Akiyoshi et al. ...... 395/200.16 |
| 5,818,930 A * | 10/1998 | Mark ......................... 379/444 |
| 5,854,824 A | 12/1998 | Bengal et al. |
| 5,909,934 A | 6/1999 | McGraw |
| 5,986,634 A | 11/1999 | Alioshin et al. |
| 6,009,528 A * | 12/1999 | Teraoka ......................... 713/1 |
| 6,023,563 A * | 2/2000 | Shani ..................... 395/200.79 |
| 6,044,411 A | 3/2000 | Berglund |
| 6,128,186 A | 10/2000 | Feierbach |
| 6,145,126 A * | 11/2000 | Matsukura et al. ........... 717/11 |
| 6,184,804 B1 | 2/2001 | Harrison |
| 6,300,863 B1 * | 10/2001 | Cotichini et al. ............ 340/5.8 |
| 6,347,345 B1 * | 2/2002 | Cheon ......................... 710/20 |
| 6,389,499 B1 | 5/2002 | Frank et al. |
| 6,400,964 B1 | 6/2002 | Zicker et al. |
| 6,427,198 B1 | 7/2002 | Berglund et al. |
| 6,470,387 B1 * | 10/2002 | Fischer ....................... 709/224 |
| 6,480,922 B1 | 11/2002 | Cunningham et al. |
| 6,526,582 B1 * | 2/2003 | Brodigan et al. ............. 725/87 |
| 6,674,457 B1 * | 1/2004 | Davies et al. ............ 348/14.01 |
| 2001/0043290 A1 | 11/2001 | Yamamoto |

* cited by examiner

*Primary Examiner*—David Y. Eng
(74) *Attorney, Agent, or Firm*—Irell & Manella LLP

(57) ABSTRACT

A locator that can be mounted to an outlet box of a network and connected to a peripheral device. The locator includes a first connector and a second connector that are attached to a housing. The locator also includes a circuit that can transmit a stored physical address data to the network. The stored physical address data corresponds to a physical location of the outlet box.

4 Claims, 7 Drawing Sheets

LOCATOR FOR PHYSICALLY LOCATING AN ELECTRONIC DEVICE IN A COMMUNICATION NETWORK

REFERENCE TO CROSS-RELATED APPLICATIONS

This application is a continuation-in-part of application Ser. No. 09/772,344 filed on Jan. 29, 2001, pending.

BACKGROUND OF THE INVENTION

1. Field of the Invention

The subject matter disclosed relates to a locator that can physically locate a device such as a phone in a communication network.

2. Background Information

Most commercial offices are configured to allow a plurality of computers to be connected to one or more servers in a network. The network may include a local area network (LAN) and/or a wide area network (WAN). The computers are typically linked to the network through a data port that is physically connected to a number of routing wires. Each computer has an associated network address. Each data port has an associated physical address. The network will typically have a router(s) and hub that route information directed to the network addresses of the computers to the appropriate physical addresses of the data ports.

Some computers also have modem boards that are connected to voice ports of a telephone network. Each voice port has a unique phone number to allow routing of incoming information transmitted through the phone network. The telephone network will typically have switches to route phone calls to the appropriate voice ports.

The server of the network may have a software program that allows an operator to correlate the network address of the computer with the physical address of the data port. This correlation allows the network router and hub to route information to the appropriate computer. Likewise, the switch(es) of the telephone network may have a software program that allows an operator to correlate a phone number with a particular a physical cable number associated with the voice port.

Commercial entities will periodically move employees to different office locations. This typically requires moving the employee's computer. Each time a computer is moved to a different location an operator must re-configure the server and/or phone switches to correlate the computer with the new data and voice port locations. Re-configuring the network is time consuming and adds to the cost of moving the employees. Additionally, the employee is unable to move the computer without seeking the assistance of an operator to re-configure the network. This limits the mobility of the employees and their computers. It would be desirable to provide a system and method that allows an end user to plug a computer into a network and have the network automatically re-configured without any operator assistance.

9-1-1 emergency systems are typically operated independent from public telephone systems. 9-1-1 systems do not have the capability to correlate phone numbers with physical locations of the caller. Consequently, a caller who is unable to communicate their physical address may not receive 9-1-1 assistance. The caller may be located at a large commercial building or campus so that even a street address may not properly convey the exact location of the caller. For example, the caller may be located at a building with multiple offices and floors. The caller may give the 9-1-1 service a street address and nothing more. The service provider, such as an ambulance service, must then figure out where the caller is physically located in the building. It would be desirable to provide a system that would allow a 9-1-1 service to readily locate the exact physical location of a caller.

Large commercial entities typically have a large number of computers, phones, printers, etc. which will be referred to as assets. To date there is not a practical system or method for keeping track of the existence and/or location of such assets. Asset management can be an important criteria particularly when the entity is trying to account for such assets. It would be desirable to provide an asset management system that can account for the existence and location of electronic assets such as computer, printers, etc.

BRIEF SUMMARY OF THE INVENTION

A locator/outlet box that is mounted to a wall and coupled to a packet switched network. The locator/outlet box contains a stored box address that corresponds to a physical location of the box. An electronic device with a device identification is connected to the locator/outlet box. The locator/outlet box reads the device identification and transmits the device identification and the box address to a server through the packet switched network. The server contains a relational database that correlates the device identification with the box address.

DETAILED DESCRIPTION

Figure 1:
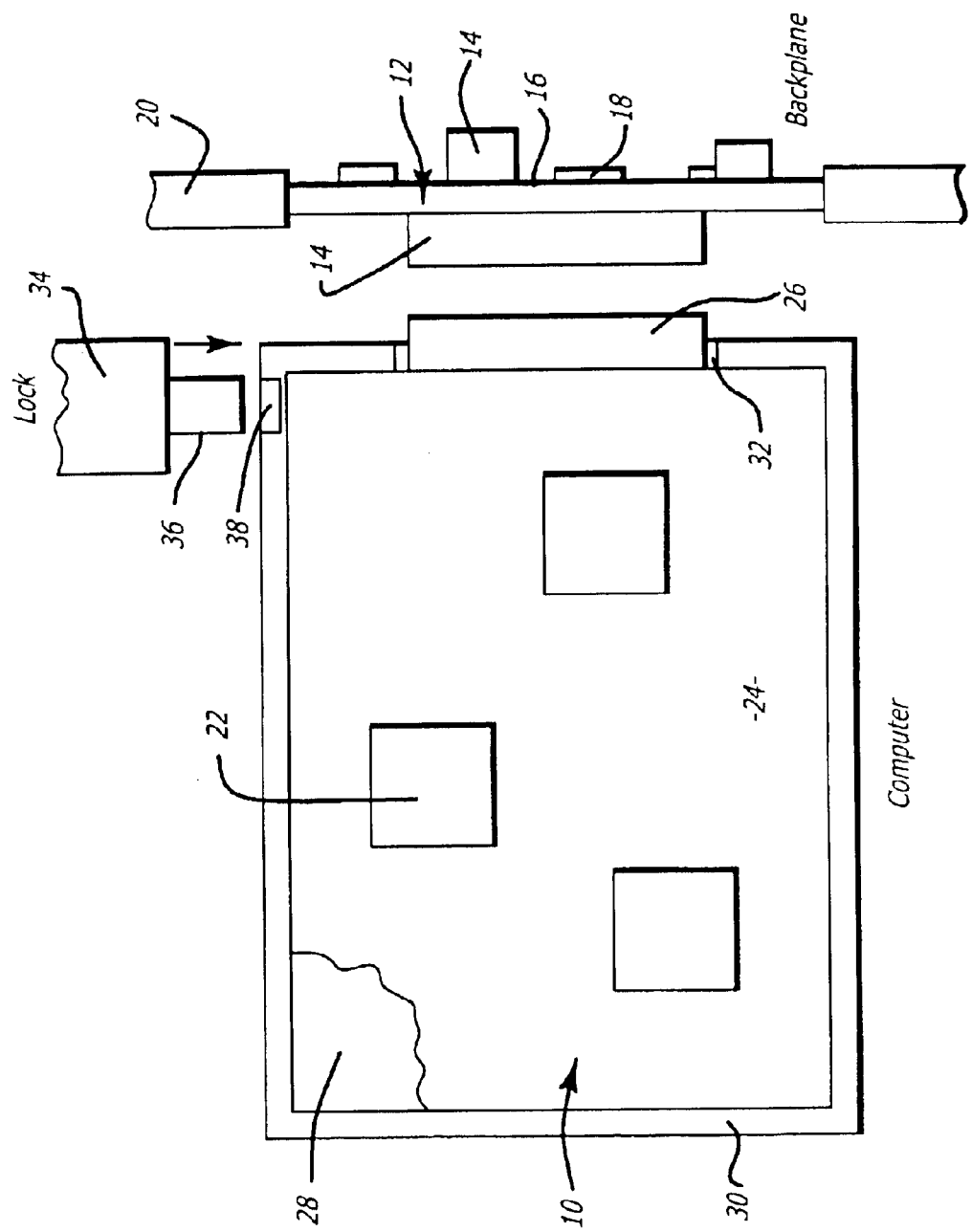
FIG. 1 is an illustration showing an embodiment of a computer and a backplane of the present invention.

Referring to the drawings more particularly by reference numbers, FIG. 1 shows a computer 10 and a backplane 12. The backplane 12 may include a plurality of electrical connectors 14 mounted to a printed circuit board 16. Each electrical connector 14 may have a keying feature to insure that only the proper corresponding device can be mated with the connector 14. The printed circuit board 16 may support a plurality of integrated circuits 18 that are coupled to the connectors 14. The backplane 12 may be mounted to a structure 20 such as a wall.

The computer 10 may include a plurality of integrated circuits 22 mounted to a printed circuit board 24. The integrated circuits 22 may be connected to an electrical connector 26 that is attached to the board 24. The connector 26 may mate with one of the connectors 14 of the backplane 12. The printed circuit board 24 may also be connected to a hard disk drive 28. The hard disk drive 28 is coupled to the integrated circuits 22. The printed circuit board 24, integrated circuits 22 and hard disk drive 28 may all be enclosed by an outer housing 30. The outer housing 30 may have an opening 32 to allow the connectors 26 and 14 to mate.

The system may include a mechanical lock 34 that is mounted to the structure 20. The lock 34 can be actuated to secure the computer 10 to the backplane 12. By way of example, the lock 34 may be a solenoid actuated plunger 36 that moves into a corresponding slot 38 in the housing 30. The plunger 36 can be moved out of the slot 38 to allow the computer 10 to be pulled out of the backplane 12.

Figure 2:
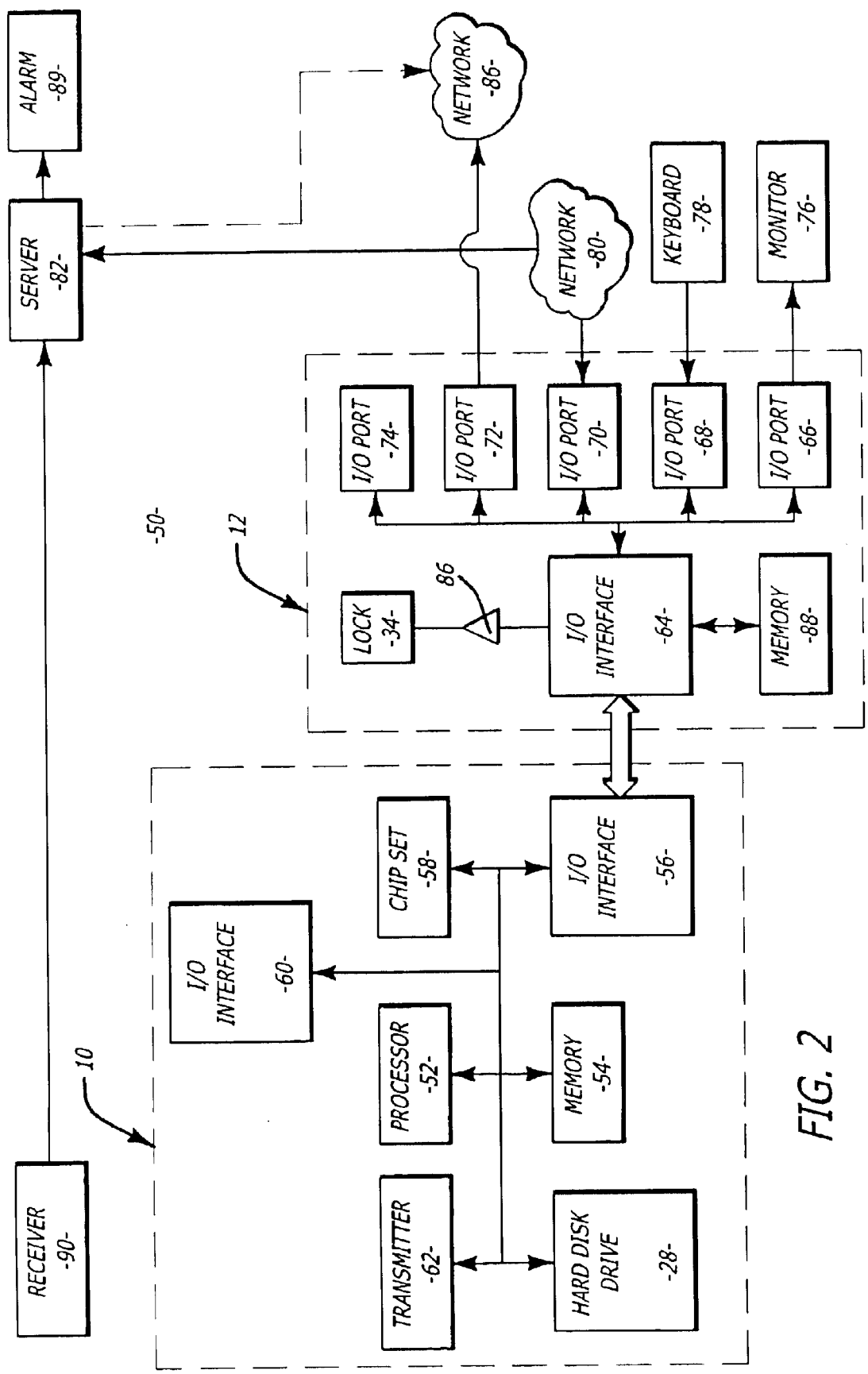
FIG. 2 is a schematic of a system that includes the computer and the backplane.

FIG. 2 shows a schematic of a system 50 that includes the computer 10 and the backplane 12. The computer 10 may include a microprocessor 52 that is coupled to one or more memory devices 54, an input/output (I/O) interface 56 and the hard disk drive 28. The memory devices 54 may include volatile and/or non-volatile memory such as dynamic random access memory (DRAM), static random access memory (SRAM) and read only memory (ROM).

The I/O interface 56 is connected to the connector 26. The microprocessor 52 may be connected to a graphics controller that is integrated with other functions such as bus management in an integrated circuit commonly referred to as a chip set 58. The microprocessor 52 may also be connected to a secondary I/O interface 60. The secondary I/O interface 60 can be coupled to an external device such as additional memory (not shown).

The computer 10 may also have a transmitter 62 that can wirelessly transmit signals. By way of example, the transmitter 62 can transmit signals at radio frequency (RF). The transmitter 62 may be coupled to a non-volatile memory device that contains an RF id. If the computer 10 is not properly shut down and detached from the backplane 12, the transmitter 62 may then automatically transmit the RF id on a continuous or periodic basis. For example, the computer 10 may require a password or biometric entry to properly shut down and remove the computer 10. If the password/biometric is not properly entered and the operator pulls the computer 10 out of the backplane 12 the processor 52 may cause the transmitter 62 to emit the RF id. The computer 10 would have a battery (not shown) to provide power to the transmitter 62.

The backplane 12 may have an I/O interface 64 that is connected to I/O ports 66, 68, 70, 72 and 74. Each I/O port 66, 68, 70, 72 and 74 is connected to a corresponding electrical connector. The I/O interface 64 is also connected to a connector that can be mated to the computer 10.

The I/O ports 66, 68, 70, 72 and 74 can be connected to external devices that communicate with the backplane 12 using different signals and different protocols. The interface 64 may contain the protocols required to transmit information through the ports 66, 68, 70, 72 and 74. The ports 66, 68, 70, 72 and 74 may have circuits to drive the signals to interface with the physical layer of the external device.

By way of example, I/O port 66, may be connected to a monitor 76. The I/O interface 64 and port 66 can be configured to transmit signals from the computer 10 in accordance with signal levels, protocols required to drive the monitor 76. The I/O interface 64 may include a hot plug firmware routine that determines the protocol, signals required to drive the monitor 76 through a series of handshake signals transmitted between the devices 64 and 76.

I/O port 68 may be connected to a keyboard 78. The interface 64 and port 68 may be configured to provide protocols and signal levels which allow information to be transmitted from the keyboard 78 to the computer 10.

I/O port 70 may be connected to a network 80. The network 80 may be connected to a server 82. By way of example, the I/O port 70 may include integrated circuits that transmit signals in accordance with an Ethernet standard.

Information may be transmitted through the network 80 in accordance with a Transmission Control Protocol/Internet Protocol (TCP/IP). I/O port 72 may be connected to a telephone network 86. The telephone network 86 may be a plain old telephone system (POTS), a public switched telephone network (PSTN), Integrated Service Data Network (ISDN), Digital Subscriber Line (DSL) or any other phone service. The interface 64 and port 72 may transmit information in accordance with the signal levels, frequencies, protocols, etc. of the telephone network.

I/O port 74 may be an open port for additional devices. For example, port 74 may support Universal Serial Bus (USB) protocol. The backplane 12 may have additional ports that support other post, present and future protocols and physical layer specifications. The I/O interface 64 may also be connected to the lock 34 by lock driver 86.

The backplane 12 may have a memory device 88 that is connected to the I/O interface 64. The memory device 88 may be non-volatile memory such as an EEPROM. The memory device 88 may include a backplane identification. The backplane identification is unique to the backplane 12.

By way of example, there are typically a plurality of backplanes 12 connected to the networks 80 and 86. Each backplane 12 will have a different backplane identification. The backplane identification may be a series of alphanumeric characters. The backplane identification may also be encrypted.

The computer 10 may store a unique client identification. The client identification may include personal information of the computer end user. The personal information may include a network address and telephone number for the computer. The client identification may be encrypted or otherwise encoded. The client identification may be stored in at least one hidden sector of the hard disk drive, to prevent unauthorized access to the client ID.

The server 82 may also be connected to the telephone network 86, an alarm 89 and a receiver 90. The receiver 90 can be adapted to receive the signal emitted by the transmitter 62 of the computer 10. The alarm 89 may include an audio and/or visual indicator such as a speaker and LCD display, respectively.

The network 80 may include routers and hubs (not shown) that route information to the computer 10 in accordance with a network address. By way of example, the network address may be an Internet Protocol (IP) address. Likewise, the telephone network 86 may switch information to the computer 10 in accordance with a telephone number.

Figure 3:
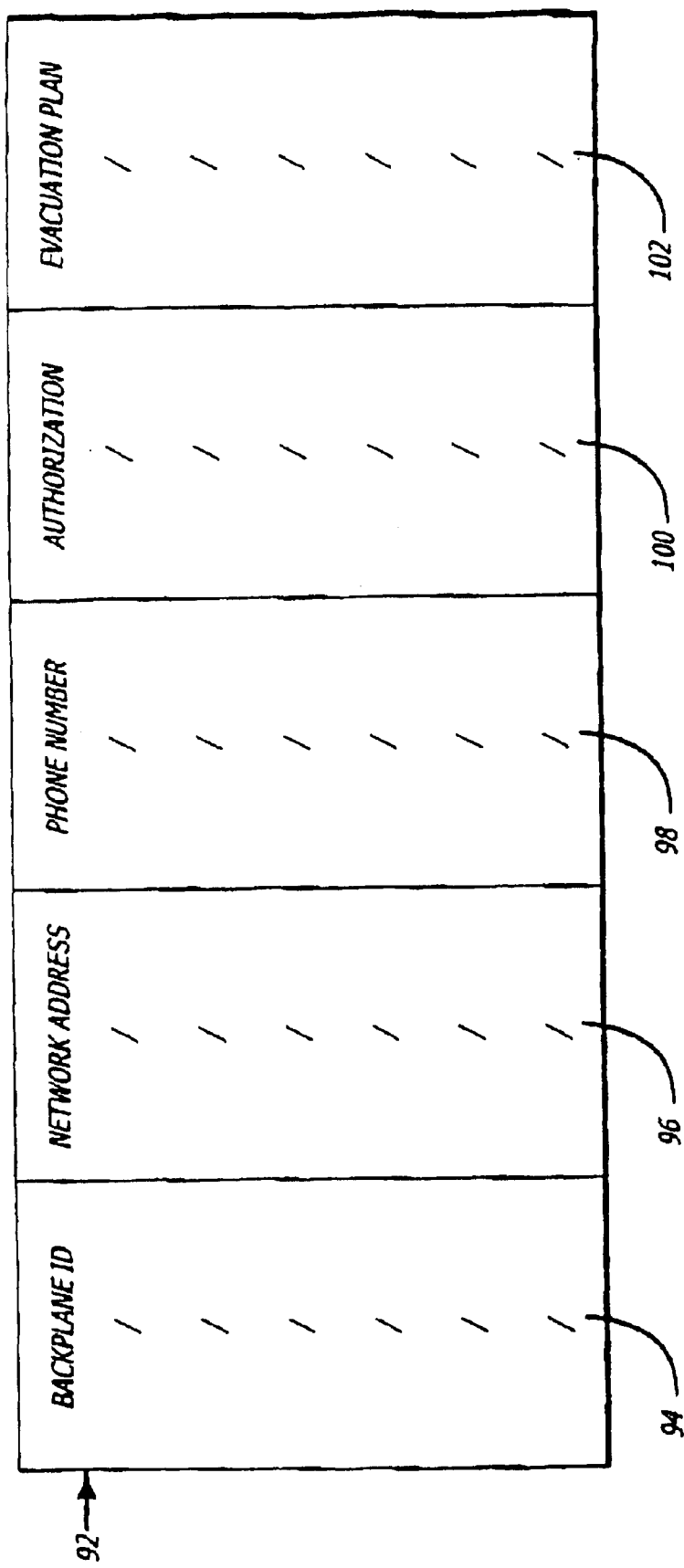
FIG. 3 is a diagram showing a relational database stored by a server of the system.

As shown in FIG. 3, the server 82 may include a relational database 92. The database 92 may have a backplane identification field 94, a network address field 96, a phone number field 98, an authorization field 100 and an evacuation plan field 102. The database 92 correlates each backplane identification and corresponding physical cable numbers of both the network connection and phone connection of the corresponding backplane, with a network address, phone number and evacuation plan.

The server 82 may operate in accordance with a software routine that accepts a command from the computer 10 and re-configures the networks 80 and 86 in accordance with the command. For example, the command may include the client identification and an instruction to re-configure the networks 80 and 86. The server 82 will then correlate the backplane identification and evacuation plan with the network address and phone number associated with the client identification. The server may include a look-up table that associates the client identification with a network address and phone number. The server 82 can then vary the network relational database to correlate the address and phone number of the client ID with the backplane that is mated with the computer. Once the networks 82 and 86 are re-configured all information associated with the address and phone number of the computer 10 will be routed to the appropriate backplane. The computer ID automatically re-configures the network(s) by transmitting a command. There is no requirement to manually re-configure the system.

The server 82 may also have a software routine that compares the client identification with an authorized client identification and activates the alarm if the identifications do not match. The server 82 may also send a command to the backplane 12 to drive the lock into a locked position so that the end user cannot unplug the computer 10 from the backplane. The server may also inhibit operation of the computer. For example, the server may send a command(s) to turn off the computer 10, or prevent communication through the backplane 12.

The transmitter 62 may transmit the RF id if the computer 10 is improperly detached from the backplane 12. The RF id signal is received by the receiver 90. The server 82 may have a software routine that drives the alarm 89 and records the alarm event when the receiver 90 senses the RF id.

Figure 4:
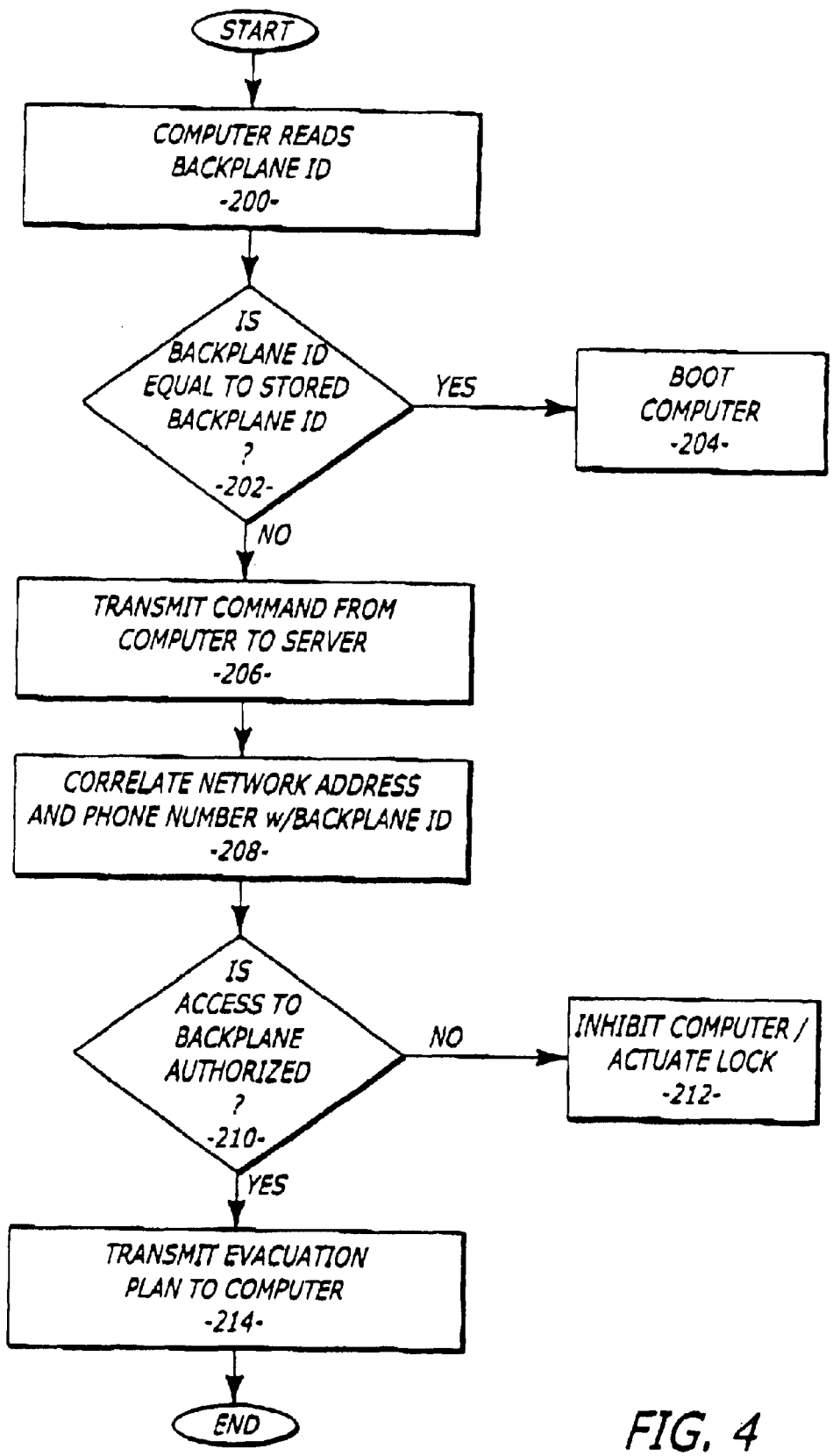
FIG. 4 is a flowchart showing an operation of the system.

The microprocessor 52 may operate in accordance with a software routine. The software routine may be performed in accordance with instructions and data stored within memory 54 and/or the hard disk drive 28. FIG. 4 describes an operation of the system by software routines performed by the computer 10 and the server 82.

The end user initially plugs the computer 10 into the backplane 12. The computer 10 then reads the backplane identification from the memory device 88 in process block 200. The backplane ID can be read during an initialization routine of the computer 40, wherein the processor 52 request data from the appropriate address(es) of the backplane memory 88. In decision block 202 the computer 10 compares the backplane identification transmitted from the backplane with a stored backplane identification. The stored backplane identification is the backplane ID for the backplane that was last coupled to the computer 10. If the identifications match, a boot up routine is run so that the computer 10 can be operated in process block 204. Matching IDs signifies that the computer 10 has not been moved to a different backplane.

If the identifications do not match, the computer transmits a command to the server in block 206. The command may include the client identification. The client ID may be retrieved from the hidden sector(s) of the hard disk drive 28.

The command may be routed to the server in accordance with a server network address entered into the computer through a configuration program. Alternatively, the server may download the network address when the computer 10 is plugged into the backplane 12. The backplane 12 may send a signal to prompt a download of the server network address when the connectors 14 and 26 are mated. The server then correlates the client identification information such as network address and phone number with the backplane identification in block 208. All information addressed to the network address and/or phone number will then be routed to the corresponding backplane associated with the client identification.

The server may compare the client identification with an authorized client identification in decision block 210. If authorization is not granted the server may transmit a command(s) to the backplane to inhibit operation of the computer and/or engage the lock in process block 212. If authorization is granted the server may then transmit a evacuation plan 214 to the computer 10. The evacuation plan may include diagrams, etc. that show the end user an evacuation route from the facility. The evacuation plan is unique to the backplane, such that the evacuation route is specifically directed to the physical location of the backplane. The computer 10 can be booted subsequent to the transmission of the command in step 206.

The present invention thus provides a system and method to automatically re-configure a network when a computer is plugged into a backplane.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Figure 5:
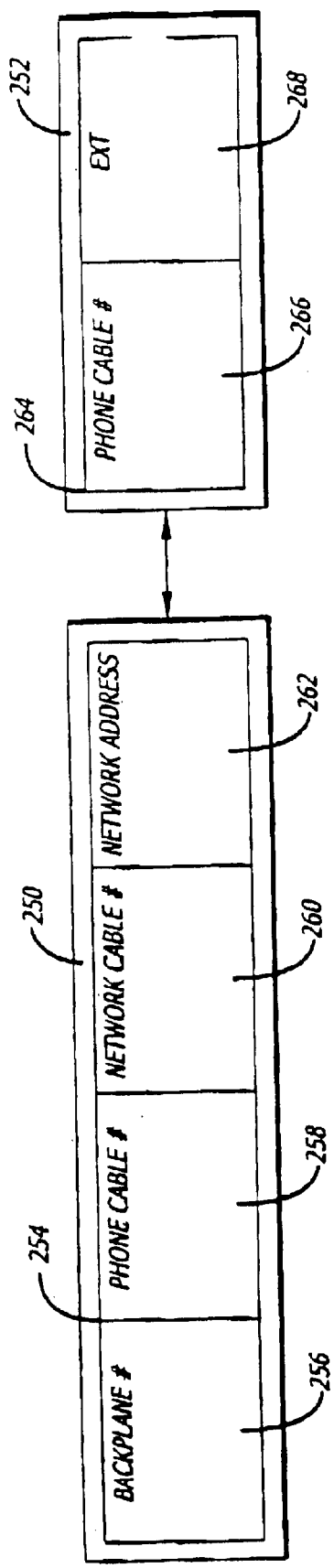
FIG. 5 is a diagram showing an alternate embodiment wherein the system includes a server that is coupled to a phone switch by a network connection.

For example FIG. 5 shows an alternate embodiment of a system with a server 250 connected to a phone switch 252. The server 250 includes a relational database 254 that has a backplane identification field 256 that is correlated with a phone cable number field 258, a network cable number field 260 and a network address field 262. The cable numbers correspond to the physical cables that are attached to the backplane with the corresponding backplane identification.

The phone switch 252 may have a relational database 264 that has a phone cable number field 266 and a phone number field 268. When the computer 10 is plugged into a different backplane both relational databases 254 and 264 are updated to correlate the network address and phone number of the computer with the physical cables attached to the backplane. This embodiment is similar to the embodiment shown in FIG. 3, except that the correlation between the phone number and cable number is provided in the phone switch 252. Conventional phone switches already have such correlations. This embodiment thus provides a system that can be readily integrated into existing phone systems. The servers 250 and 252 can be linked by a network line. By way of example, the network line may operate in accordance with an Ethernet protocol. Connecting servers 250 and 252 over a network line may allow voice over IP service for the system. Incoming phone calls can be routed to the backplane through the servers 250 and 252.

Figure 6:
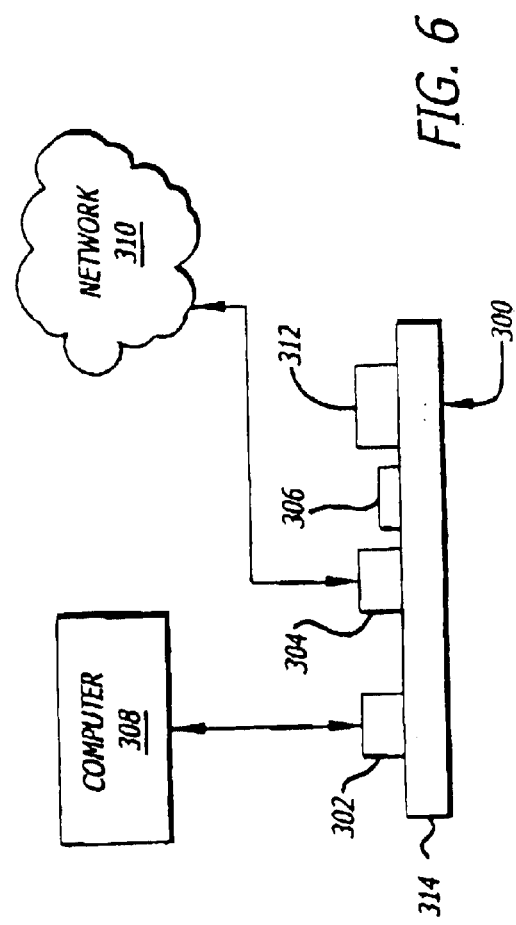
FIG. 6 is an illustration showing an alternate embodiment of a backplane that can be coupled to a computer.

FIG. 6 shows another embodiment of a backplane 300 that has a pair of network connectors 302 and 304, and one or more integrated circuits 306. Connector 302 can be coupled to a computer 308. Connector 304 can be coupled to a network 310. The integrated circuits 306 may include a backplane identification, hardware and firmware that allow the computer 308 to be connected to the network 310 in accordance with the teachings of the embodiment shown in FIGS. 1–4. The backplane 300 may be packaged as a consumer product that can be purchased and connected to an existing computer 308. The product may also include software that can be loaded into the computer 308 to operate the routine shown and discussed in the embodiments of FIGS. 1–4. The backplane 300 may have an additional power connector 312 to provide power for the integrated circuits 306. The connectors 302 can be plugged into the LAN connections of the computer 308 and network 310. The connectors 302, 304, 312 and integrated circuits 306 may be mounted to a single printed circuit board 314.

Although a technique is described wherein the computer does not send a command until the backplane ID does not match a stored backplane ID, it is to be understood that the system may operate in another matter. For example, the computer may automatically send the command to configure the relational database each time the computer is mated with the backplane and/or every time power is turned onto the system.

Likewise, although a system is described wherein the computer 10 transmits the command, it is to be understood that the backplane 12 can be constructed and configured to read the stored backplane ID in the computer 10 and then send the re-configuration command. By way of example, the backplane 12 may include a digital signal processor (DSP) that performs one or more steps to re-configure the database.

Figure 7:
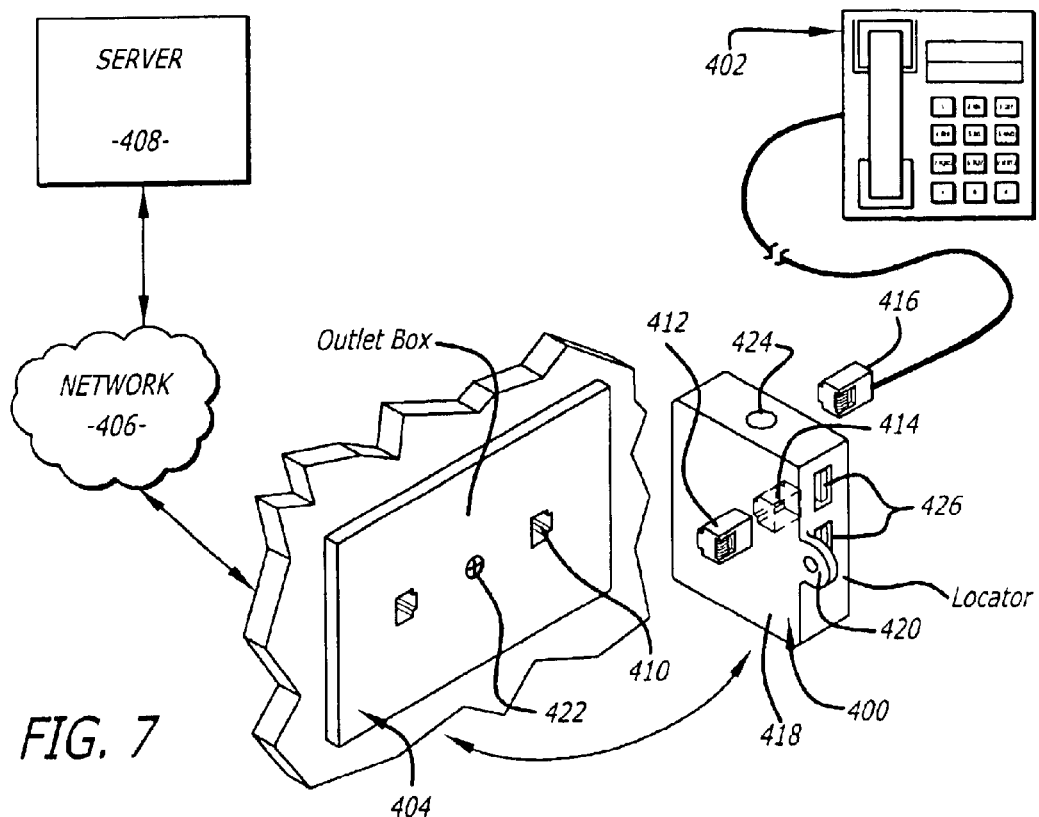
FIG. 7 is an illustration of a locator system.

FIG. 7 shows an embodiment of a physical locator 400 for a peripheral device 402. By way of example the peripheral device 402 may be a telephone. Although a phone is shown, it is to be understood that the device 402 may be a computer, PDA or other electronic device used for communication. The locator 400 may be mounted to a telephone outlet box 404. The outlet box 404 can be connected to a network 406. The network 406 may be a PSTN, ISDN or other public telephone system. The network 406 may also be, or include, a packet switched network such as the internet. With a packet switched network the phone 402 may be a VOIP device.

The network 406 may be connected to a server 408 that contains a relational database. Although a server 408 is described, item 408 may be any device that can store a relational database.

The outlet box 404 may include one or more female connectors 410. By way of example, the connectors 410 may be a RJ-11 or RJ-45 device. The locator 400 includes a corresponding connector 412 that can be plugged into the outlet 404. The locator 400 will also have a female connector 414 that will receive a corresponding male connector 416 coupled to the phone 402. The connectors 412 and 414 may be attached to a locator housing 418. By way of example, the housing 418 may be constructed from a molded plastic material. The housing 418 may include a mounting ear 420 to allow the locator 400 to be mounted to the outlet box 404 by a fastener 422.

The locator 400 may include a power port 424 that can be connected to an external power source (not shown). The external power source may be required to power the internal circuits of the locator 400. By way of example, the external power source may include a transformer, rectifier, etc. that is commonly used to convert AC power to DC power for use in integrated circuits. Although a power port 424 is shown and described, it is to be understood that the network 406 may provide power to the locator 400 through the connectors 410 and 412.

The locator 400 may include one or more additional connectors 426 attached to the housing 418. The connectors 426 can be attached to additional external devices (not shown). By way of example, the connectors 426 may be universal serial bus (USB) devices. The USB connectors can be connected to devices that support USB protocol such as computers and printers.

Figure 8:
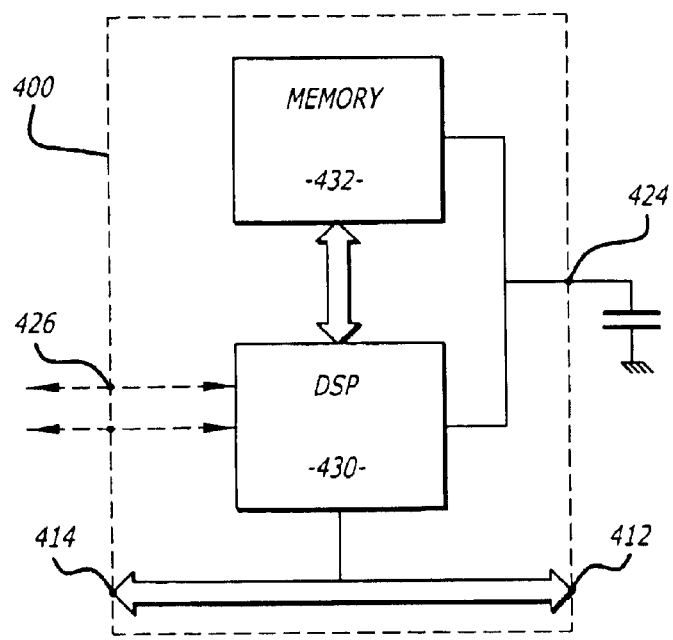
FIG. 8 is a schematic of a locator.

FIG. 8 is a schematic of the locator 400. The locator 400 may include a controller or processor 430 that is connected to memory 432. By way of example, the controller 430 may be a digital signal processor (DSP). Memory 432 may include volatile and/or non-volatile memory. For example, memory 432 may include static dynamic random memory (SRAM). Memory 432 may store instruction and data that is used by the controller 430 to perform one or more computations and/or routines.

Although a processor is shown and described, it is to be understood that the locator may have other logic circuits that perform the required functions. For example, the locator may have programmable logic such as decoders, etc. to perform the required functions.

Although a separate locator plugged into an outlet box is shown and described, it is to be understood that the locator can be integrated into an outlet box. It being understood that a separate locator module will be required to retrofit existing outlet boxes to include the locator function. New outlet boxes may contain the locator circuits etc. that are then mounted into building structures. Likewise, although the locator is shown mounted to the outlet box, the locator may be connected to the box by an intermediate telephone cord.

Figure 9:
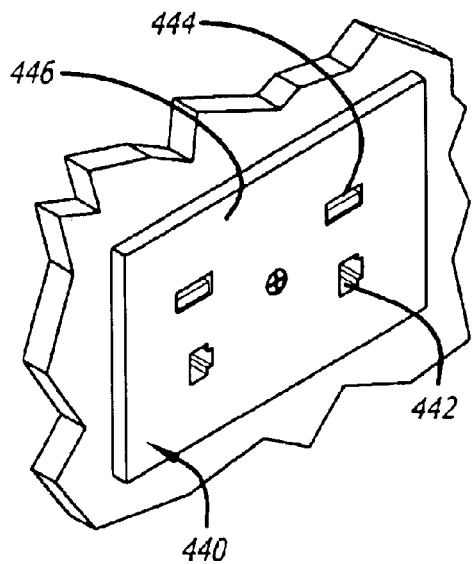
FIG. 9 is an illustration of an outlet box/locator.

FIG. 9 shows an embodiment of an integrated outlet box/locator 440. The box/locator 440 would have one or more female RJ-45 connectors 442 and may have one or more USB connectors 444 attached to a housing 446. The housing 446 contains the locator circuits. The circuits may be assembled into a modular assembly that can be snapped into and out of the housing 446. The backside of the box/locator 440 is hardwired to the network and a power line. The locator circuits may include circuits to convert AC to DC power. Alternatively, the box/locator may have a power outlet that can be connected to an external AC/DC converter.

Figure 10:
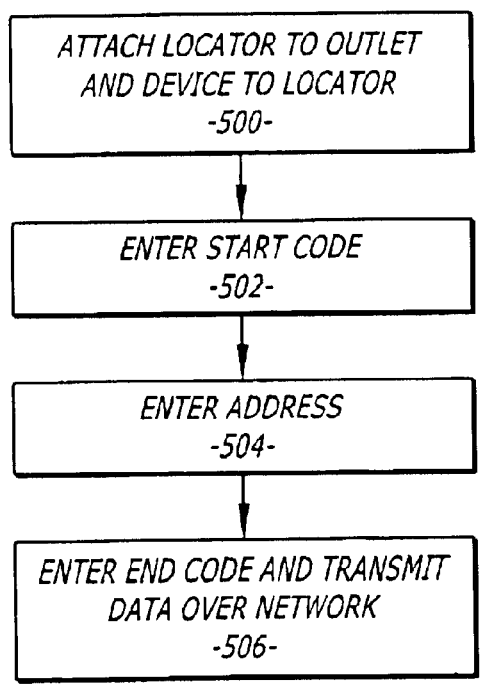
FIG. 10 is a flowchart showing operation of the locator.

Referring to FIG. 10 the locator 400 may operate in the following manner. The locator 400 may be plugged into the outlet 404 and the device 402 may be connected to the locator 400 in block 500. The phone device 402 may be used as a keypad to enter data into the locator 400. Alternatively, a computer or hand held device (not shown) may be connected to the locator to enter data. The phone device 402 would be used to manually enter data, whereas the computer or hand held device could automatically enter data.

In block 502, the user enters a start code to indicate that the following information will be data to be stored in memory of the locator 400. The start code should be a sequence of alphanumeric characters that will not be used to dial a phone number or telephonically operate a remote system such as a voice mail or a voice messaging system.

In block 504, the user enters the physical location of the outlet through the phone keypad. For example, if the user is at a commercial building, they may enter an address of "Building A, floor 4, column 3, 123 Main Street, Sparkle City". The user may also enter the phone number of the device. The address and phone number are stored in memory 432 of the locator 400. The locator 400 may also have a locator address stored in memory 432 that is unique for each locator unit.

In step 506, the user enters an end code that indicates that the data has been completed. The end code may also cause the locator to transmit the physical address, locator address and phone data over the network to the server 408. The relational database of the server 408 then stores the data so that the phone number is correlated with the physical address and the locator address. A subsequent call by the user can be detected and correlated so that the recipient can readily determine the callers physical address.

For example, the caller may place a 9-1-1 emergency call through the phone device 402. The caller may be unable to tell the 9-1-1 service their address, or the caller may give an address to a large commercial building without identifying their specific location within the building. The emergency service will be able to determine the exact physical location of the caller from the relational database which correlates the phone number with the physical address (e.g. column 3, floor 4 of Building A). The database may also include additional information such as the age, height, weight, past medical history, etc. of the caller. This information could also be retrieved from another database through a call routine of the relational database.

It may be desirable to encode the physical address data with the locator address data to prevent unauthorized access to the data and to prevent "prank" 9-1-1 calls. The data may be encoded by combining and/or blending the physical address data with the locator address data.

Although the process is described so that the locator 400 transmits the data upon entry of the end code, it is to be understood that the data may be stored in the locator memory and only transmitted upon a subsequent 9-1-1 entry. Additionally, although transmission of the locator address is described, it is to be understood that the locator may only transmit the physical address and phone number.

As yet another embodiment, the locator 400 may transmit the physical address stored in memory every time the caller dials 9-1-1 or some other predefined number. Thus the emergency service will get the physical address of the caller each time they call 9-1-1.

The USB ports 426 allow the locator 400 to also become an asset management device. The controller 430 may read information from each device that is plugged into a USB port. For example, a computer and a printer may be plugged into separate USB connectors of the locator 400. The computer will typically have a phone and/or network card connected to the locator USB port. The locator 400 may read the MAC address of the computer network card and the printer and then retransmit this information to the server along with the physical address and/or locator address. The server may contain a database that lists the existence and the physical location of each device. This allows a proprietor of the devices to readily keep track of its assets. The asset manager locator function could work the same or similar to the computer/backplane system described and shown in FIGS. 1–6. The locator would be equivalent to the backplane and the external devices would be equivalent to the computer. Like the embodiments of FIGS. 1–6, the device may read the locator address and send a command to re-configure a database either automatically, or in the event a stored locator address did not match the locator address read from the locator. The locator 400 would be configured to allow data to be transmitted between devices. For example, the locator would allow instructions and data to be transmitted from a computer to a printer.

As an alternative, the database may have a wire map relational database that correlates individual outlets with the physical address of the outlet. The locator could then provide a locator address that is transmitted to the server and is correlated with the specific physical address by the database. When a device is plugged into a locator connector, the locator transmits a message that includes the device ID and the locator address data, without physical address data. The relational database can then correlate the device ID with the physical address. The asset management function may be separate or in combination with the 9-1-1 function of the locator.

The locator may also function as a gateway that is coupled to a number of monitoring devices. For example, the locator may be connected to an electric utility meter, gas utility meter, gas leak detector, smoke detector, burglar alarm. The locator may transmit information to a remote site that relates to the functions of these devices. For example, the locator may transmit power usage data, physical address data and/or locator address data to a remote site.

It is generally understood that once installed, the locator 400 is not physically removed from the outlet box on which it is connected. Therefore, even though the user may change phones, computers, etc., the physical address of the locator is always the same. The locator creates a permanent electronic physical address. This allows for improved 9-1-1 service, asset management and household monitoring.

What is claimed is:

1. A method for locating an electronic device coupled, to an outlet box that is mounted to a wall, and a packet switched network, the outlet box containing a box address that corresponds to a physical location of the outlet box, comprising:

connecting an electronic device to the outlet box, the electronic device having a device identification;

transmitting the device identification to the outlet box;

reading the device identification within the outlet box;

transmitting the box address and the device identification from the outlet box to a server through the packet switched network; and, correlating the device identification with the box address and corresponding physical location of the outlet box in a relational database of the server.

2. The method of claim 1, further entering a phone number that is read by the outlet box and is transmitted to the server through the packet switched network.

3. The method of claim 1, wherein the box address includes a locator address.

4. The method of claim 1, wherein the box address is transmitted in response to the entering of a 9-1-1 phone number through the peripheral device.

* * * * *